United States Patent [19]
Beissner

[11] 3,914,814
[45] Oct. 28, 1975

[54] METHOD OF AND DEVICE FOR PLACING WASHERS, SPRING RINGS, TOOTHED DISCS, AND SIMILAR ELEMENTS ONTO THE SHANKS OF BOLTS, AND THE LIKE

[75] Inventor: Hans-Walter Beissner, Ludenscheid, Germany

[73] Assignee: Gebr. Hilgeland, Wuppertal, Germany

[22] Filed: July 30, 1973

[21] Appl. No.: 384,104

[30] Foreign Application Priority Data
Aug. 4, 1972 Germany............................ 2238439

[52] U.S. Cl.............................................. 10/155 A
[51] Int. Cl.² .......................................... B23P 19/08
[58] Field of Search .......... 10/155 A, 155 R, 162 R, 10/165, 169, 162 A

[56] References Cited
UNITED STATES PATENTS

| | | | |
|---|---|---|---|
| 2,927,333 | 3/1960 | Stern................................. | 10/155 A |
| 3,012,258 | 12/1961 | Schott et al....................... | 10/155 A |
| 3,323,155 | 6/1967 | Cooley et al...................... | 10/155 R |
| 3,406,414 | 10/1968 | Kulaga et al...................... | 10/155 R |
| 3,523,316 | 8/1970 | Alexander......................... | 10/155 A |
| 3,622,039 | 11/1971 | Lindstrom......................... | 10/155 A |
| 3,707,010 | 12/1972 | Gronwald ......................... | 10/155 A |
| 3,745,599 | 7/1973 | Ringland.......................... | 10/155 A |
| 3,750,206 | 8/1973 | Pomernacki...................... | 10/155 A |

Primary Examiner—C. W. Lanham
Assistant Examiner—E. M. Combs
Attorney, Agent, or Firm—Walter Becker

[57] ABSTRACT

A method and apparatus for assembling bolts with washers in which respective conveying means withdraws bolts and washers from respective supplies thereof. The bolts are conveyed through an assembly station and the washers are supplied to the assembly station in tilted up position by moving them along a channel by a pulse of air. The washers are pushed up on the bolts after the bolts engage the washers by an air curtain and are thereafter mechanically supported. The bolts move through an ejection station which follows the assembly station and bolts without washers thereon are detected and ejected in the ejection station by a jet of air.

3 Claims, 11 Drawing Figures

METHOD OF AND DEVICE FOR PLACING WASHERS, SPRING RINGS, TOOTHED DISCS, AND SIMILAR ELEMENTS ONTO THE SHANKS OF BOLTS, AND THE LIKE

The present invention relates to a method of and device for placing washers, spring rings, toothed discs, and similar elements onto the shanks of bolts and the like, while bolts and discs respectively withdrawn from one supply container each are aligned and brought into a predetermined position and are oriented with regard to a connecting area in the region of which the discs are inclined with regard to the axis of the shanks of the bolts secured against axial displacement and held at a withdrawing area in such a way that the shanks hit the front portion (when viewed in transporting direction) of the rim of the bores provided in said discs whereby the discs are withdrawn and subsequently are placed upon the shanks of the bolts. Devices operating in conformity with this principle are known and described, for instance, in German Offenlegungsschrift No. 1,810,203.

According to the said known device, a plurality of washers closely arranged one behind the other and in contact with each other are located in a guiding groove. The washers pass under the influence of the force of gravity successively to a withdrawing station at which they are removed by the shank of bolts to which they are moved at a suitable angle. For purposes of aiding the effect of the force of gravity, a constant air stream is employed which is directed in the direction of movement of the discs in the guiding groove.

A considerable drawback of this known device consists in that it can be successively employed only for conveying flat non-tooth equipped washers. The device is not usable when toothed discs, spring rings, or the like, are to be placed on the shanks of bolts. When conveying serially arranged spring rings, toothed discs, and the like, adjacent discs easily catch or jam in the guiding groove so that an uninterrupted transport and withdrawal of the discs will not be possible even at low output. The withdrawing station or that station where the respective washer to be withdrawn is located is not precisely defined. This, in particular, when greater output is required is a further cause for disorders during the operation and causes corresponding work failure.

It is, therefore, an object of the present invention so to improve the above mentioned heretofore known method and devices that they can also be used for handling spring rings, toothed discs, and similar elements in a disorder-free manner.

These and other objects and advantages of the invention will appear more clearly from the following specification, in connection with the accompanying drawings, in which.

The object underlying the present invention has been realized by shooting the washers individually onto a predetermined path to the withdrawing station and at an interval in conformity with the bolts passing by the connecting station. The shooting is effected by means of compressed air. The discs are braked within the region of the withdrawing station and are held in readiness for withdrawal in a defined position.

The advantage of the method and device according to the present invention consists in that by means of compressed air it is possible to shoot a disc to the withdrawal station within a very short time period by selecting the pressure of the compressed air, so that a high output will be realized. A device working according to the present invention has, according to numerous tests, a considerably higher output than heretofore known devices of the type involved without any disorders occurring during the operation. This applies to the same degree to the handling of ordinary washers, spring rings, toothed discs, and the like.

After a disc has at the withdrawing station been withdrawn by the shank of the bolt, the washers can be moved onto the bolt by employing an inclined surface extending along the bolt shank, as shown, for instance, in German Pat. No. 1,015,302. Instead of this arrangement, it is also possible according to a further development of the invention, to expose the washers held at the withdrawing station to an additional air stream during the withdrawal of a bolt. This additional air stream transports the washer over the shank to at least close to the head of the bolt. In this way, in many operations, a longer inclined surface is not needed.

The apparatus for carrying out the method according to the invention is characterized primarily by a device which separates the washers into individual washers and is furthermore characterized by conveying means for conveying the washers prior to entering a substantially airtight closed conveying passage. The apparatus according to the invention is additionally characterized by a nozzle which is connectable to a supply of compressed air and is directed to the respective washer located in front of the entrance to said passage. The apparatus according to the invention furthermore comprises a catching or collecting and braking device for the washers which catching and braking device is located at the exit of said passage and simultaneously forms the withdrawal station for the washers. The apparatus according to the invention also comprises synchronously operating driving means for the conveying means for the washers and furthermore comprises the conveying means for the bolts.

Figure 1:
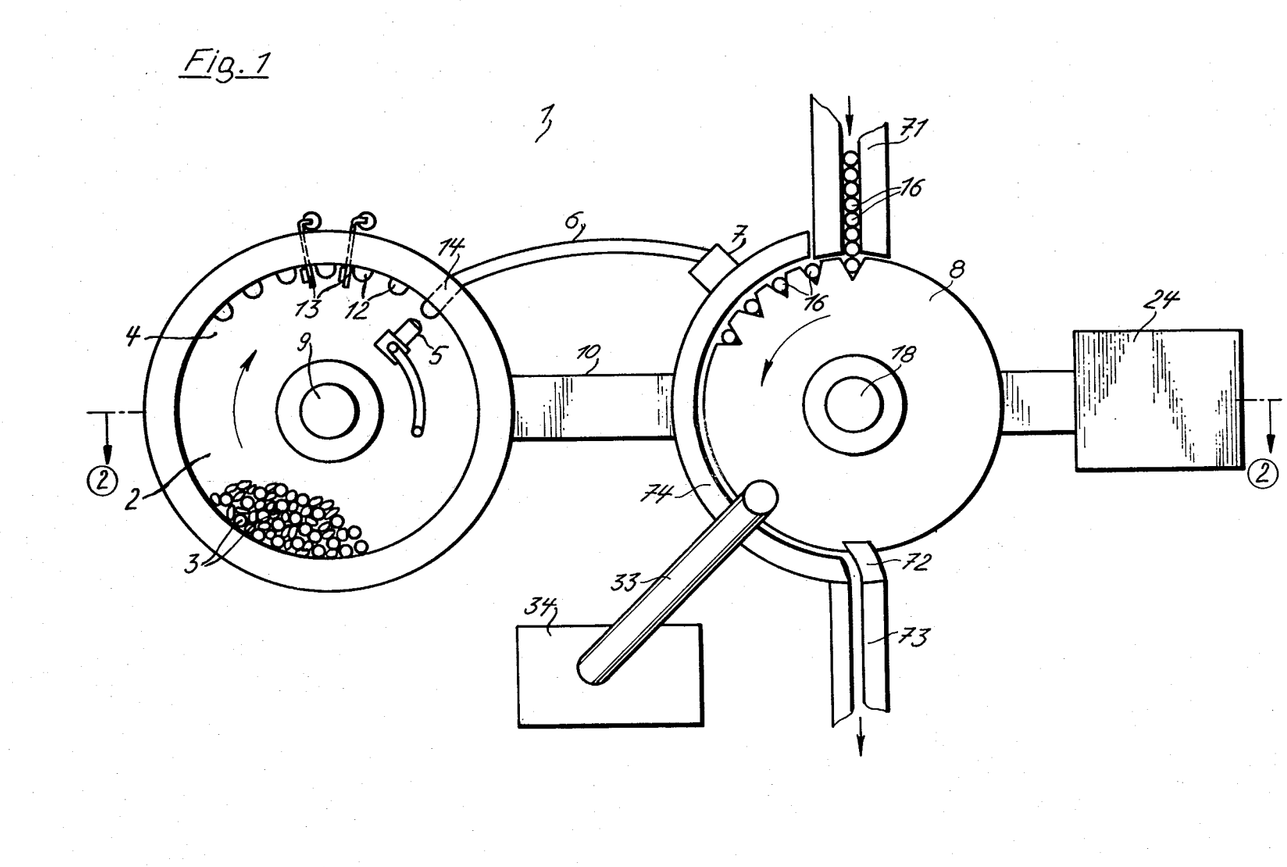
FIG. 1 diagrammatically illustrates a top view of the device according to the invention.
Figure 2:
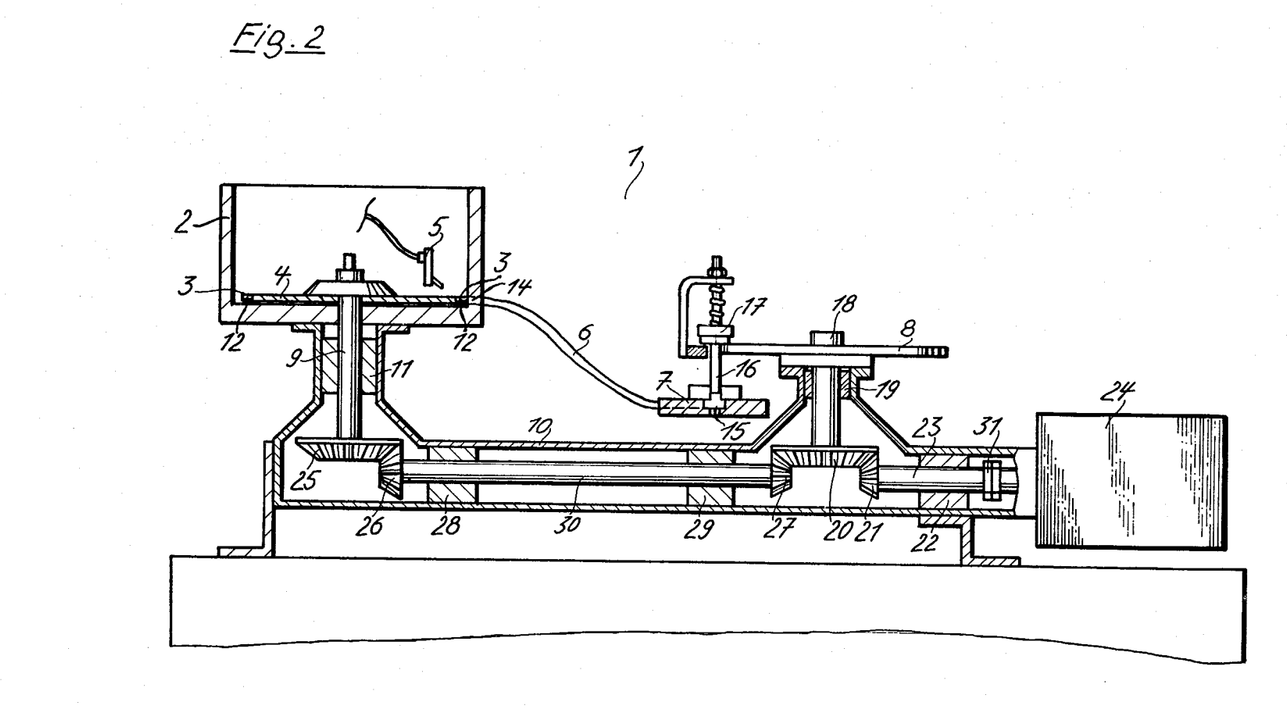
FIG. 2 shows the device of FIG. 1 in side view and in section along the line 2—2 of FIG. 1.

Referring now to the drawings in detail, the apparatus shown therein and generally designated with reference numeral 1 and intended for placing washers on bolts, consists primarily of a supply container 2 for washers 3, a conveying disc 4, a nozzle 5, a conveying passage 6, a catching or collecting and braking device 7, and a conveying disc 8. The conveying disc 4 is within the region of the bottom of the supply container 2 connected to a rotatable shaft 9 which, in its turn, is rotatably journaled in a diagrammatically illustrated bearing 11 connected in a housing 10. The supply container 2 is likewise connected to the housing 10 and, more specifically, in such a way that the bottom of the supply container 2 is inclined relative to the vertical plane. The conveyor disc 4 has recesses 12 which are uniformly distributed over the circumference of disc 4 and are open toward the periphery of the disc. These recesses 12 are only slightly greater than the washers to be sorted into individual washers. Within the range of the recesses 12, strippers 13 are provided which extend close over the recesses 12 and are preferably yieldably pivotably mounted on the supply container 2.

The supply container 2 has an opening 14 which is so great that it permits the passage of a washer. Adjacent the opening 14 is a conveying passage 6 which leads from the opening 14 to the catching and braking device 7. The conveying passage 6 may consist of a curved pipe. The free inner cross section corresponds at least within the range of the catching and braking device to the cross section of a washer. The catching and braking device 7 is connected to the housing 10, and more specifically, in such a way that the washers held by the catching and braking device 7 in a definite position will, within the region of the ends of the bolt shanks which by the conveyor disc 8 are passed by the withdrawing station 15, have an inclination of, for instance, 30° relative to the axes of the bolts. The bolts are, in FIGS. 1 and 2, designated with the reference numeral 16. Above the withdrawing station 15 on that side of the conveying disc 8 which is located opposite to the withdrawing station, there is provided a downholder 17 to prevent the escape of the bolt during the withdrawal of the washers from the catching and braking device 7.

The conveying disc 8 is connected to a rotatable shaft 18 which is journaled in a bearing 19 connected to the housing 10. The rotatable shaft 18 is operatively connected through bevel gears 20 and 21 and a shaft 23 journaled in a bearing 22 in housing 10, with a motor 24. The bevel gear 25 which is connected to the rotatable shaft 9 is dirvingly connected with the bevel gear 20 through bevel gears 26 and 27 which are connected to a shaft 30, which in housing 10 is journaled in bearings 28 and 29. In this way, it will be assured that the conveying discs 4 and 8 are driven synchronously. Between the motor 24 and the bevel gear 21 and shaft 23 there is provided a slip clutch 31 as safety means against overload.

In the conveying path of bolts 16, within the vicinity of the circumference of the conveyor disc 8 there is located a nozzle 32 (FIG. 10) which is connectable to a supply of compressed air. The outlet opening of nozzle 32 is directed toward the lower range of the respective bolt thereabove which is supported by the conveyor disc 8. At the same area of the circumference of the conveyor disc 8, and more specifically on that side of the conveyor disc 8 which is located opposite the nozzle 32 there is located the inlet opening of a pipe 33 (FIG. 11), the outlet opening of which leads to a catching container 34.

Figure 3:
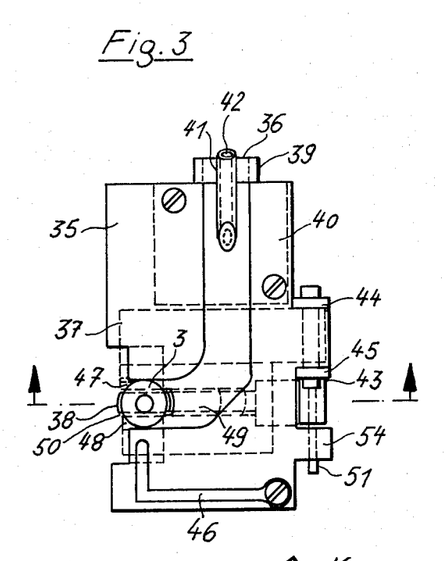
FIG. 3 is a top view of a catch and braking device for the discs.
Figure 4:
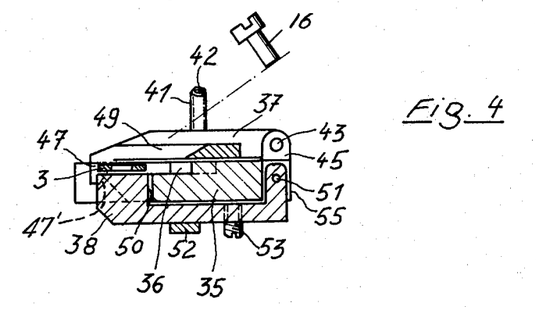
FIG. 4 is a section taken along the line 4—4 of FIG. 3.
Figure 5:
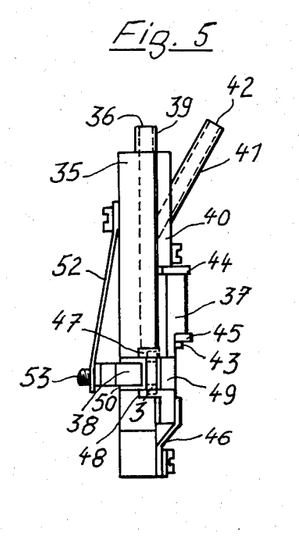
FIG. 5 is a side view of the catching and braking device according to FIG. 3.

The catching and braking device which is illustrated on a larger scale in FIGS. 3 – 5 comprises primarily a basic body 35 with a guiding groove 36 for the washers 3, with a flap 37 inclined as shown in FIG. 4 and a supporting lever 38. The guiding groove 36 corresponds as to its width and height approximately the dimensions of a washer 3. The catching and braking device 7 is, through the intervention of an extension 39, connected to the respective end of the conveyor passage 6. The guiding groove 36 is closed partially by a plate 40. The plate 40 has an extension 41 with a bore 42 which leads through plate 40 to the guiding groove 36. Adjacent the plate 40, the guiding groove 36 is covered up by the flap 37. The flap 37 is pivotable about a bolt 43 which is connected in bearings 44, 45. The basic body 35 has connected thereto a spring 46, the free end of which biases the flap 37 in such a way that the flap 37 covers up the guiding groove 36. Within the region of the front end of the guiding groove extending along a curved line in the basic body 35, the flap 37 has tooth-shaped extensions 47, 48. These extensions 47, 48 extend into the region of movement of washers 3 and on that side thereof which faces toward the guiding groove 36 have an inclined surface 47' which when viewing in the direction of movement of the washers points toward the guiding groove 36. Within the region of the extensions 47, 48 in flap 37 and in the basic body 35, there are provided recesses 49 and 50 which are open in the withdrawal direction of the washers. The width of the recesses 49 and 50 is slightly greater than the diameter of the shank of the bolts. The recess 50 is filled in by the supporting lever 38, the free end of which, is flush with that plane of the guiding groove 36 which is located opposite the flap 37. The supporting lever 38 is pivotally mounted on a bolt 51 which is journaled on the basic body 35. The lever 38 is biased by a spring 52. By means of an abutment screw 53, the position of the supporting lever 38 may be set relative to the guiding groove 36. The bolt 51 is connected to the extensions 54, 55 of the basic body 35. The flap 37 and the plate 40 are, for reason of better showing the details of the pipe plate 35 therebelow, shown as dash lines.

Figure 6:
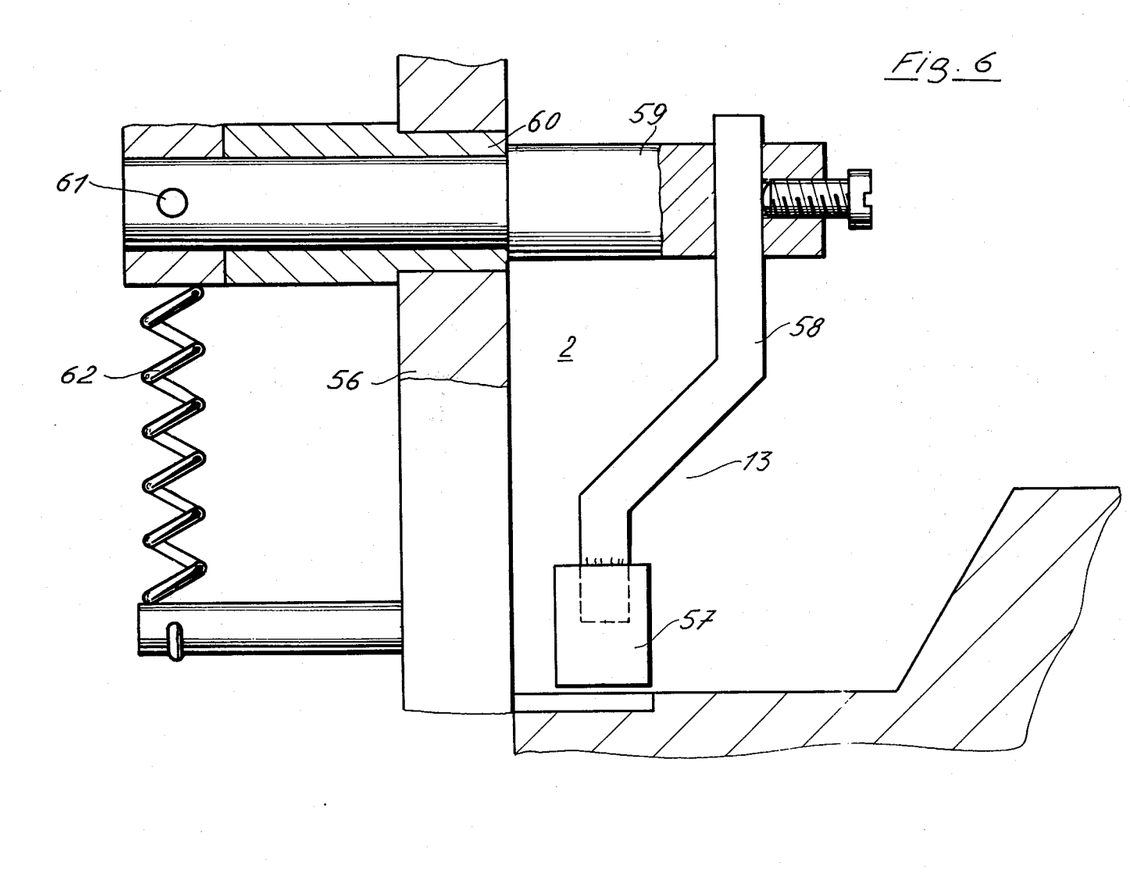
FIG. 6 shows a portion of a supply container for the discs with additional advantageous details.

FIG. 6 illustrates on a larger scale, a stripper 13 which is pivotally mounted on the wall 56 of the supply container 2. The stripper 13 comprises a stripper plate 57 which is connected to one end of a rod 58. The other end of the rod 58 is connected to a pivotable shaft 59. The shaft 59 is rotatably journaled in a bushing 60 which is connected to the wall 56. At that end of the shaft 59 which faces away from the rod 58, an arm 61 is connected to shaft 59. The free end of arm 61 is engaged by a spring 62.

Figure 7:
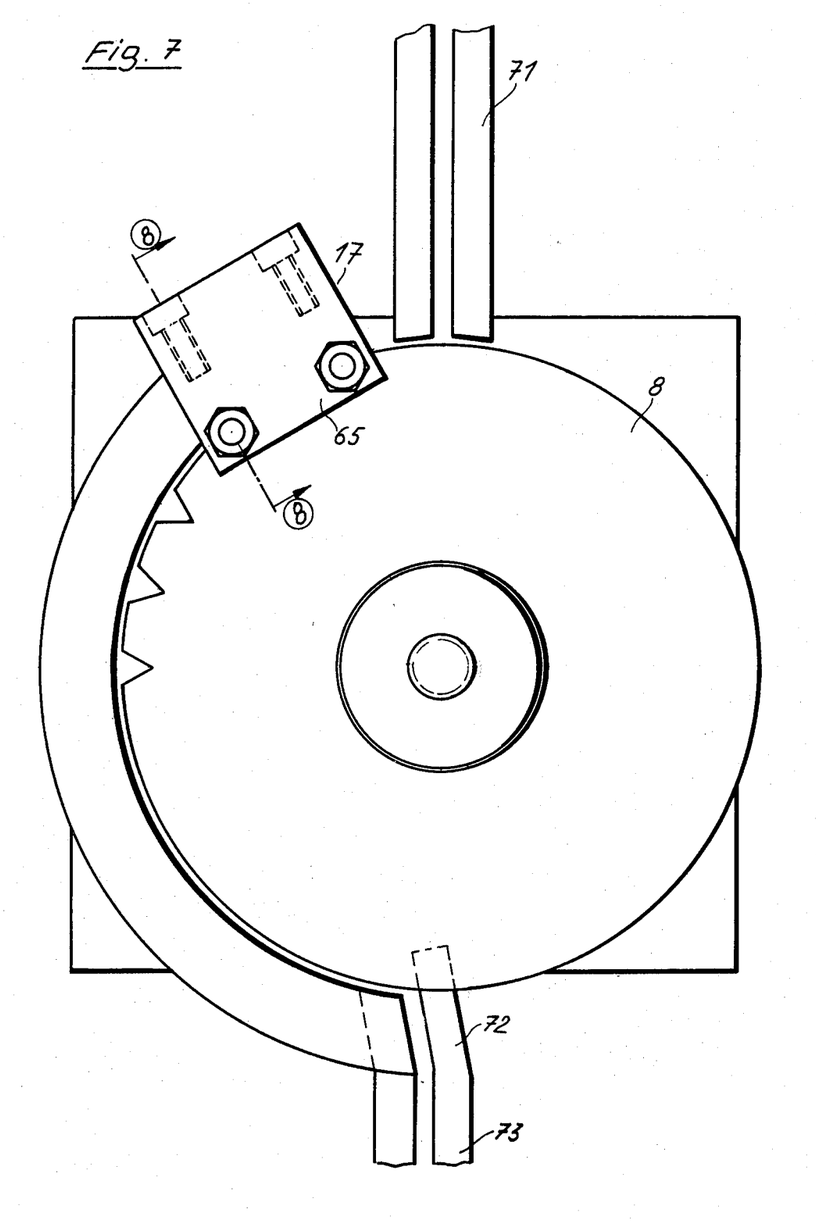
FIG. 7 illustrates the transporting device for the bolts with further details.
Figure 8:
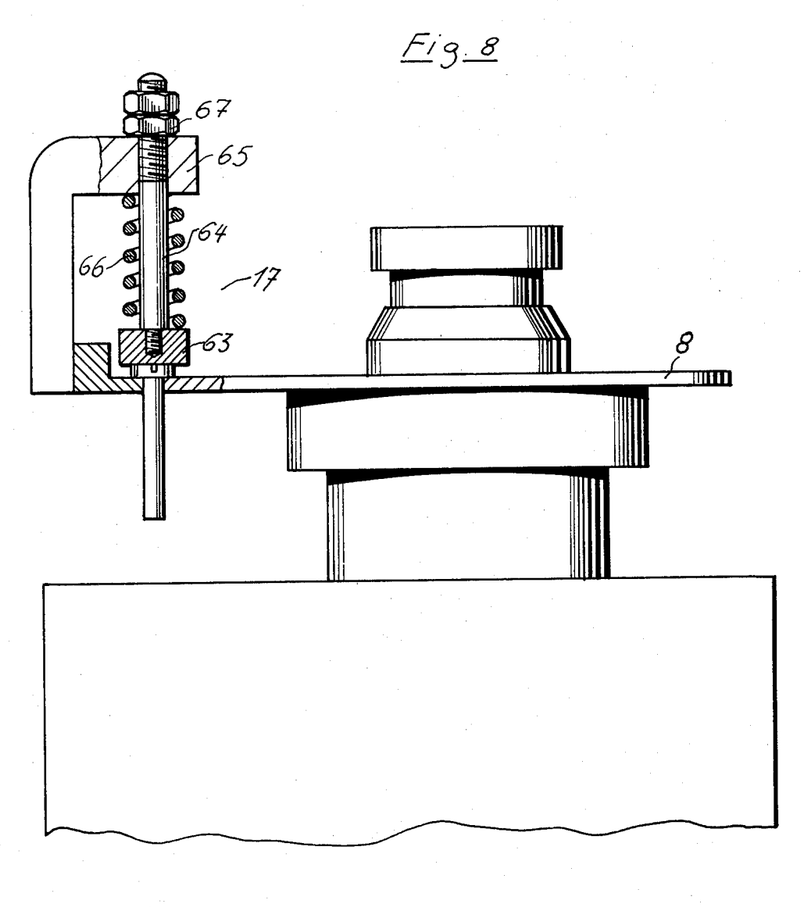
FIG. 8 is a section taken along the line 8—8 of FIG. 7.

FIGS. 7 and 8 illustrate on a larger scale the downholder 17 arranged within the region of the conveyor disc 8. The holder 17 is, in a nonillustrated manner, connected to the housing 10 or another area, in any convenient manner. The holder 17 comprises a pressure plate 63 which is connected to one end of a pin 64. The pin 64 is longitudinally displaceably guided in a stationary bearing 65 and is biased by a pressure spring 66. For purposes of limiting the displacement of the pin 64 toward the heads of the bolts, there is provided an adjustable abutment 67. This abutment may be formed by a thread provided on pin 64 on that side of the bearing 65 which is located opposite the pressure spring 66, in cooperation with a screw nut.

Figure 9:
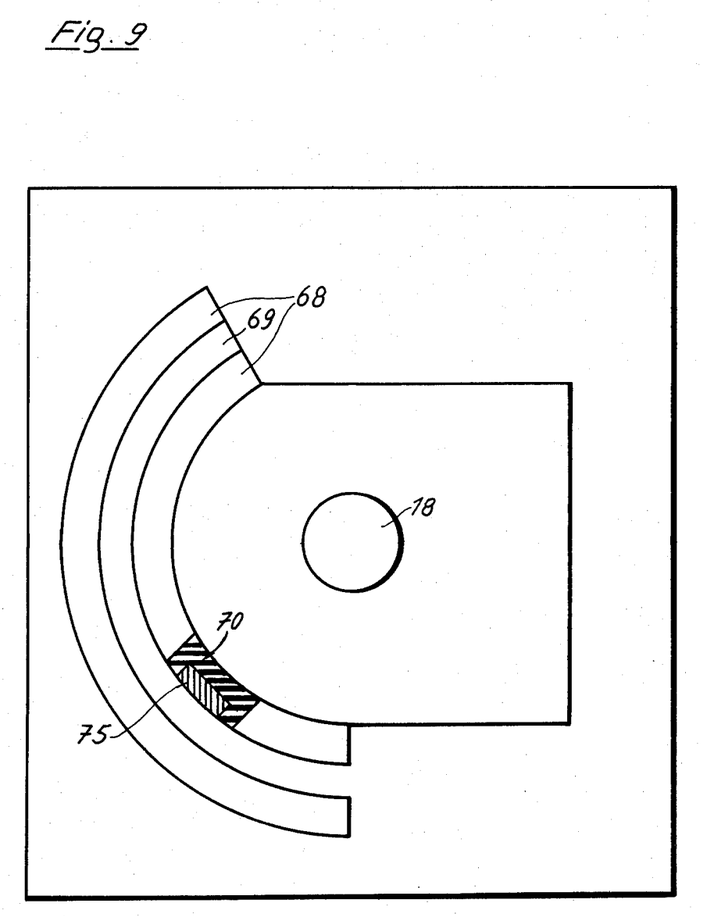
FIG. 9 shows a contact located in the path of the washers placed upon the shanks of the bolts.
Figure 10:
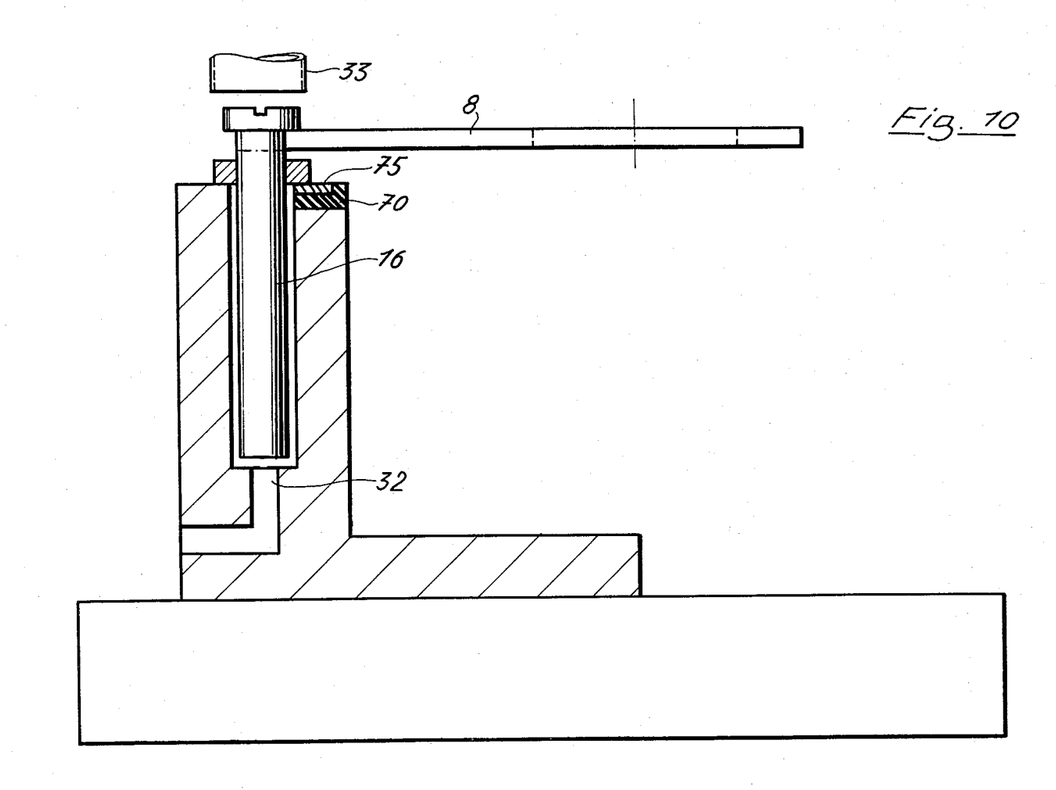
FIG. 10 illustrates a blowing device located in the path of the bolts provided with washers.

FIG. 9 shows a guiding passage 6 provided below the guiding disc 8 for the bolts 16. The passage 68 is provided with a guiding groove 69 for the shanks of the bolts. The width of the guiding groove 69 is only slightly greater than the diameter of the shank of the bolts so that washers previously placed upon the shanks will slide on the two sides of the guiding passage 68 in conformity with the movement of the bolts. On one side of the guiding passage 68 which is formed out of metal, within the path of the washers there is provided an insulating member 70 (FIG. 10). Within the region of said member 70, below the shanks of the bolts, and within the guiding groove 69 there is located the nozzle 32 which, by means of nonillustrated electrically controllable devices can be connected to a source of compressed air.

Figure 11:
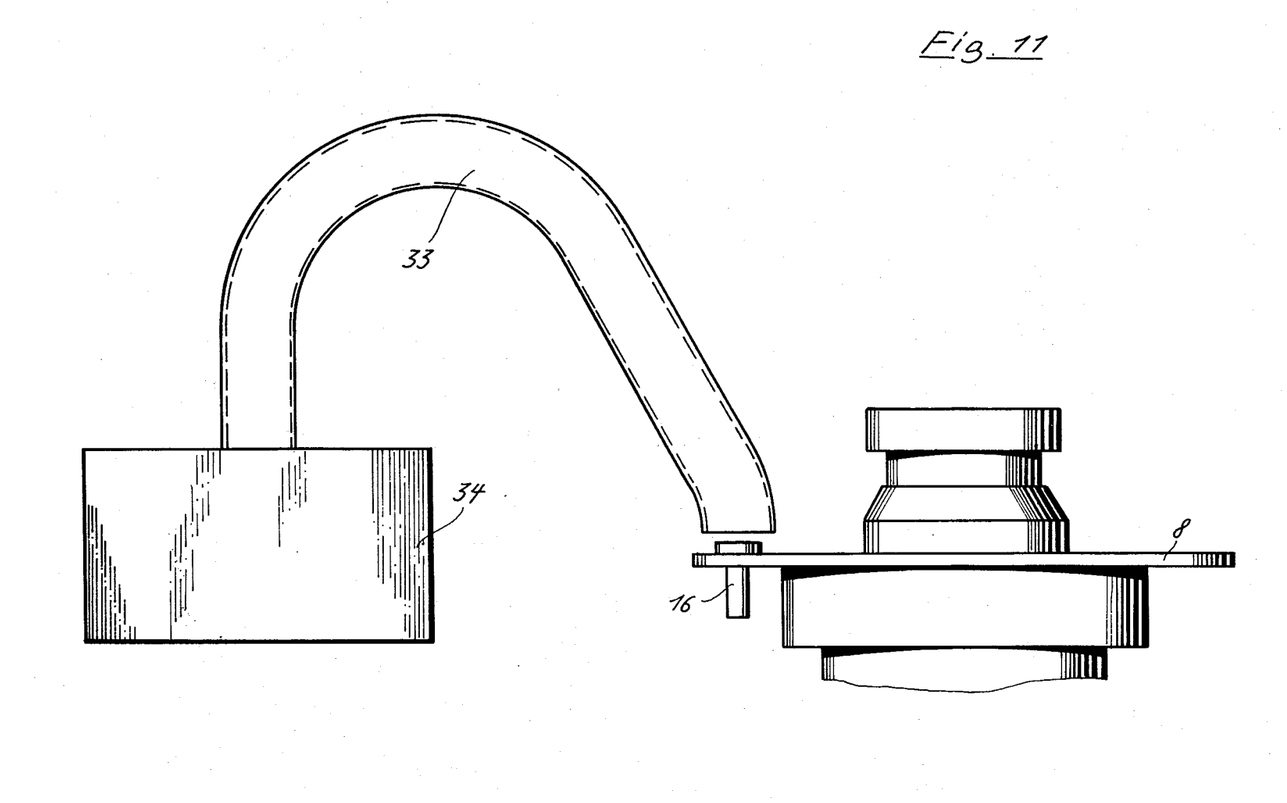
FIG. 11 shows a pipe for guiding bolts into a catching container, which bolts have been blown out of the transporting device.

FIG. 11 shows the pipe 33 of FIG. 1 on a larger scale than that of FIG. 1. The right-hand end (with regard to the drawing) of pipe 33 is located within the region of the nozzle 32 (FIG. 10) closely above the range of movement of the heads of the bolts, whereas the left-hand end (with regard to the drawing) of a pipe 33 leads into the catching container 34.

The operation of the apparatus according to the invention is as follows:

The bolts with their shanks hanging downwardly are, by means of a feeding chute 71 (FIG. 1) conveyed in front of the conveyor disc 8. By means of the recesses located at the circumference of the conveyor disc or wheel 8, the bolts are successively withdrawn from the feed chute and are, through a conveyor path having an approximately semicircular contour conveyed to a discharge chute 73 equipped with a stripper 72. Adjacent the chute 73, the bolts then provided with washers can be conveyed, for instance, to a thread-rolling device. Within the region of the conveyor path of the bolts there is provided an annular member 74 which is located in the plane of the conveyor disc 8 so that the heads of the bolts rest partially on the conveyor disc 8 and partially on the annular member 74 while they are being conveyed. Between the end of the feeding chute 71 and the catching and braking device 7, there is below the conveyor disc 8 provided an electric contact which is adapted to be actuated by the shanks of the bolts. This contact controls a nonillustrated magnetic valve located in the path of the compressed air for nozzle 5 so that always when a bolt appears within the region of the catching and braking device, a compressed air pulse is emitted by the nozzle 5.

The washers in the supply container 2 are by means of the conveyor disc 4 which rotates, for instance, in the indicated direction sorted into individual washers and aligned in a predetermined position by the fact that from the supply of washers which in view of a predetermined inclination of the supply container is located only in a corresponding partial region of the supply container, one washer only is withdrawn by means of the recesses 12. If it should occur that more than one washer is taken along by one recess, the strippers 13 are provided. These strippers reach so close to the plane of the conveyor disc 4 that such excessive washers are stripped off, in other words, washers which rest on washers in the recesses.

By means of the above mentioned electric contact, a compressed air pulse is emitted by nozzle 5 just when one of the recesses 12 is located ahead of the opening 14 in the wall of the supply container 2. The frequency of the succession of recesses 12 with regard to the opening 14 corresponds in view of the synchronous drive of discs 4 and 8 and the predetermined pitch of said conveyor discs with regard to the recesses, precisely to the frequency of the bolts appearing at the withdrawing station. Thus, each washer which by means of the recesses 12 in conveyor disc 4 is conveyed to a point in front of the opening 14, is by means of compressed air shot to the withdrawing station and is here withdrawn by the shank of the respective bolt. At the withdrawal station, the plane of the washer is inclined to the axis of the bolt for purposes of withdrawal in a manner known per se. The holder 17 is provided for preventing an escape of the bolt during the withdrawal of the washers.

The conveyor passage 6 is at that end which is located opposite the opening 14 of the supply container 2 connected to the extension 39 of the catching and braking device 7. The washers shot through the conveying passage 8 move along the guiding groove 36 of the catching and braking device 7 up to a point in front of the tooth-shaped extensions 47, 48 of the flap 37. By correspondingly shaping that side of flap 37 which faces toward the washers and, as the case may be, of the supporting lever 38, it can be assured that the washers will additionally be held in a defined position when braking the disc to a zero speed. When placing ordinary washers onto the shanks of bolts, the supporting lever 38 is not necessary. The employment of the supporting lever 38 becomes advantageous when, for instance, over the circumference nonuniform washers as, for instance, spring rings are to be placed upon the bolt shanks. In such an instance, the supporting lever 38 assures a complete support of a washer, especially also (when viewed in withdrawing direction) in the front region, and thus serves for maintaining a position which is favorable for withdrawing the washer by the bolt. During the withdrawal of a washer, the supporting lever 38 is pivoted by the free end of the shank of the bolt out of the region of the washer. The inclined surfaces which are provided on the tooth-shaped extensions 47, 48 and face toward the guiding groove 36 make possible the withdrawal of the washers while the flap 37 slightly lifts off from the guiding groove 36. The length of the recess 49 in flap 37 or of the recess 50 in the basic body 35 (recess 50 being filled in by the lever 38) is determined primarily by the angle at which the bolts 16 hit the washers 3.

Compressed air can be conveyed in a constant manner to the conveying groove 36 through the extension 41 with bore 42, and to a slighter extent than during the conveying of the washers through passage 6. In this way, it will be realized that the washers shortly after being withdrawn by the bolts will by a corresponding air stream be conveyed up to below the heads of the bolts so that a special longer inclined surface as it is provided with heretofore known devices is not necessary for a further complete placing of the washers.

During a further conveying of the bolts with the withdrawn washers, the latter slide in the guiding passage 68. On one side of the guiding passage 68 there is located over a portion of the insulating member 70 a contact 75 which is electrically separated from the remaining portions of the guiding passage. This contact 75 controls a nonillustrated magnetic valve which is located in the path of the nozzle 32. The length of the contact 75 approximately corresponds to the distance between successive bolts so that at any time at least one washer moves over the contact. The electric contact which is thus normally established in this way between the contact 75 and the other side of the guiding passage 68 prevents the nozzle 32 from being connected to compressed air. As soon, however, as a bolt is transported without a washer, temporarily during the transport of this bolt, the said electric contact is interrupted so that the nozzle, by means of the above mentioned magnetic valve will be connected to compressed air and the bolt will be blown out. The blown-out bolt is through pipe 33 conveyed into the catching container 34.

In view of the mass inertia of the bolt and in view of the temporary delay of the various functions which delay prevails in the entire blow-out system, it is advantageous for safely blowing out bolts with each operation, to trigger the above mentioned magnetic valve by elements by means of which different delays of the release pulse for the magnetic valve are adjustable.

Instead of forming the conveying passage 6 by a pipe with suitable clear inner cross section, the conveying passage 6 may also be formed by different rails composed in conformity with the desired course of the conveying passage, and with guiding grooves of approximately rectangular cross section. In this instance, the guiding grooves are covered up by cover plates in order to maintain the guiding passage substantially airtight.

It is, of course, to be understood that the present invention is, by no means, limited to the specific showing in the drawings, but also comprises any modifications within the scope of the appended claims.

I claim:

1. In combination with a device for automatically placing washers or like annular elements on the shank of bolts or the like; first means for withdrawing elements singly in a predetermined oriented position from a supply thereof, second means operating in synchronism with said first means for withdrawing bolts singly in a predetermined oriented position from a supply thereof, an assembly station, said second means conveying said bolts in succession through said assembly station, third means in said assembly station for releasably supporting said elements in the path of the bolts moving through said assembly station for engagement of each element by a respective bolt and withdrawal of the element from said third means by said bolt, a guide channel for said elements substantially closed peripherally and having one open end adjacent said first means and another open end adjacent said third means, a nozzle near said one open end operable when supplied with compressed air to impel an element shot individually from said first means into said one open end of said channel and along said channel to said other open end and into said third means, said third means comprising a base member, means defining a groove formed in the base member which at one end communicates with said other open end of said channel, said groove extending in the direction of movement of the elements in the groove, a plate on said base member and covering said groove and pivoted to the base member on an axis at right angles to the direction of movement of bolts through said assembly station, said axis being on the side of the plate facing approaching bolts, extensions on said plate extending into said groove and inclined in the direction of movement of elements in the groove, said plate and base member being slotted to permit bolt shanks to pass therethrough while engaging elements stopped against said extensions.

2. A device in combination according to claim 1 which includes a yieldable filler element in the slot in said base member and displaceable by a bolt passing along said slot.

3. A device in combination according to claim 1 which includes means for supplying compressed air to said groove near the said one end thereof to impel elements supplied to the groove toward the said other end thereof.

* * * * *